(12) United States Patent
Nichols et al.

(10) Patent No.: US 8,572,304 B2
(45) Date of Patent: Oct. 29, 2013

(54) SYSTEMS AND METHODS FOR CONFIGURING MOBILE DEVICES FOR PRINTING TO WIRELESS PRINTERS

(75) Inventors: Timothy C. Nichols, Los Altos, CA (US); Geoffrey W. Chatterton, Santa Clara, CA (US); Ramaneek Khanna, Saratoga, CA (US); Eric D. Bauswell, Bettendorf, IA (US); Anthony R. Chvala, Hartland, WI (US)

(73) Assignee: Wellala, Inc., Hartland, WI (US)

( * ) Notice: Subject to any disclaimer, the term of this patent is extended or adjusted under 35 U.S.C. 154(b) by 583 days.

(21) Appl. No.: 12/960,740

(22) Filed: Dec. 6, 2010

(65) Prior Publication Data
US 2012/0075664 A1    Mar. 29, 2012

Related U.S. Application Data

(60) Provisional application No. 61/387,354, filed on Sep. 28, 2010.

(51) Int. Cl.
   *G06F 13/00*    (2006.01)
   *G06F 3/00*    (2006.01)

(52) U.S. Cl.
   USPC ................ 710/104; 710/8; 709/220

(58) Field of Classification Search
   USPC ............... 710/8–14, 104; 709/220; 358/1.15
   See application file for complete search history.

(56) References Cited

U.S. PATENT DOCUMENTS

| | | | |
|---|---|---|---|
| 6,705,781 B2 | 3/2004 | Iwazaki | |
| 7,170,618 B2 | 1/2007 | Fujitani et al. | |
| 7,298,518 B2 | 11/2007 | Fujitani et al. | |
| 7,457,417 B1 * | 11/2008 | Mirza-Baig | 380/270 |
| 7,463,378 B2 | 12/2008 | Williams et al. | |
| 7,483,161 B2 | 1/2009 | Fujitani et al. | |
| 7,636,584 B2 | 12/2009 | Anderson et al. | |
| 7,647,074 B2 | 1/2010 | McCoog et al. | |

(Continued)

FOREIGN PATENT DOCUMENTS

| | | |
|---|---|---|
| EP | 1271298 A2 | 1/2003 |
| JP | 2005117528 | 4/2005 |
| JP | 2008125093 | 5/2008 |

OTHER PUBLICATIONS

English-language abstract of Japanese Patent Application Publication No. JP2005117528, Japan Patent Office, 2005.

(Continued)

*Primary Examiner* — Christopher Shin
(74) *Attorney, Agent, or Firm* — DASCENZO Intellectual Property Law, P.C.

(57) ABSTRACT

The present disclosure is directed to systems and methods for configuring mobile communication devices to identify and communicate with wireless printing devices. These systems and methods may include determining available wireless printing devices, selecting a desired wireless printing device, attempting to establish communication between the mobile communication device and the wireless printing device using a first communication protocol, prompting a user to indicate the successfulness of the first communication protocol, and configuring the mobile communication device for printing to the wireless printing device using the first communication protocol if the first communication protocol successfully communicated with the wireless printing device. The systems and methods may further include prompting the user to indicate that the first communication protocol was not successful if the first communication protocol did not successfully communicate with the wireless printing device and repeating the method using another available communication protocol.

29 Claims, 5 Drawing Sheets

(56) References Cited

U.S. PATENT DOCUMENTS

| | | |
|---|---|---|
| 7,761,090 B2 | 7/2010 | Silverbrook et al. |
| 7,792,491 B2 | 9/2010 | Whitten |
| 2003/0002072 A1 | 1/2003 | Berkema et al. |
| 2003/0005330 A1* | 1/2003 | Berkema et al. ............... 713/201 |
| 2004/0133525 A1 | 7/2004 | Singh et al. |
| 2004/0137928 A1 | 7/2004 | Biundo |
| 2004/0218207 A1 | 11/2004 | Biundo et al. |
| 2004/0252332 A1 | 12/2004 | McCoog et al. |
| 2004/0253981 A1* | 12/2004 | Blume et al. ............... 455/552.1 |
| 2005/0132094 A1 | 6/2005 | Wu |
| 2006/0044598 A1 | 3/2006 | Etelapera |
| 2006/0105714 A1* | 5/2006 | Hall et al. .................... 455/41.3 |
| 2008/0096486 A1 | 4/2008 | Whitten |
| 2008/0233881 A1* | 9/2008 | Baker ............................. 455/42 |
| 2010/0113011 A1* | 5/2010 | Gregg et al. ................... 455/425 |
| 2011/0244814 A1* | 10/2011 | Andreu et al. ................ 455/90.1 |
| 2012/0314254 A1* | 12/2012 | McCoog et al. ............. 358/1.15 |
| 2012/0330556 A1* | 12/2012 | Shaanan et al. ................. 702/19 |

OTHER PUBLICATIONS

English-language abstract of Japanese Patent Application Publication No. JP2008125093, Japan Patent Office, 2008.

* cited by examiner

SYSTEMS AND METHODS FOR CONFIGURING MOBILE DEVICES FOR PRINTING TO WIRELESS PRINTERS

RELATED APPLICATION

This application claims priority under 35 U.S.C. §119(e) to U.S. Provisional Patent Application Ser. No. 61/387,354, which is entitled "SYSTEMS AND METHODS FOR CONFIGURING MOBILE DEVICES FOR PRINTING TO WIRELESS PRINTERS," was filed on Sep. 28, 2010, and the complete disclosure of which is hereby incorporated by reference.

FIELD OF THE DISCLOSURE

The present disclosure is related generally to the field of wireless communication between wireless devices and wireless printing devices, and more particularly to systems and methods for configuring mobile devices to identify and print to wireless printers.

BACKGROUND OF THE DISCLOSURE

It is often desirable to wirelessly transfer information from a mobile communication device, such as a cellular telephone, to a peripheral, such as a printer or other printing device. However, mobile communication devices often have limited memory and/or processing resources and less functionality when compared to a personal or laptop computer. Thus, traditional methods for establishing communication between a computer and a printing device may not be readily available to a mobile communication device.

Traditional printing from a computer to a printer may involve the computer communicating with the printer over a wired or wireless connection. In either case, the computer links to the printer, converts content to be printed (which additionally or alternatively may be referred to as a "print job") into a format that is understandable by the printer, and then transmits or otherwise transfers the print job to the printer for printing. The communication between the printer and the computer is formatted according to protocols that may be based on industry standards and/or may be specific to the printer make and/or model being utilized. In general, a printer cannot be utilized by a device that lacks the ability to convert the content to be printed into a format that is understandable by the printer. While this limitation often may be overcome by equipping a computer with a driver that is configured to translate the content to be printed into a format that is understandable by the printer, the use of drivers with mobile communication devices is often impractical due to the large number of drivers and the large amount of storage space that would be necessary to accommodate the wide variety of printers and print jobs that are available today.

This is particularly true for wireless communication devices, such as cellular and other mobile telephones, that may possess limited memory resources and/or lack the basic infrastructure necessary to utilize the functionality that traditional printer drivers provide. In addition, even if the mobile telephone does possess sufficient memory resources and infrastructure, a printer-specific driver may be unavailable for the wireless communication device and/or the wireless printing device in question and/or may be inconvenient to obtain or install. Thus, there exists a need for systems and methods for identifying and configuring communication between wireless communication devices and wireless printing devices, including systems and methods that may enable this communication without the need for or use of drivers that are specific to the wireless communication device and/or the wireless printing device being utilized.

SUMMARY OF THE DISCLOSURE

The present disclosure is directed to systems and methods for configuring mobile devices to identify and communicate with wireless printing devices. As discussed in more detail herein, these systems and methods may include determining available wireless printing devices, selecting a wireless printing device from the available wireless printing devices, attempting to establish communication between the mobile device and the wireless printing device using a first communication protocol of a plurality of available communication protocols, prompting a user to indicate the successfulness of the first communication protocol, and configuring the mobile device for printing to the wireless printing device using the first communication protocol if the first communication protocol successfully communicated with the wireless printing device. The systems and methods may further include prompting the user to indicate that the first communication protocol was not successful if the first communication protocol did not successfully communicate with the wireless printing device, and repeating the method using another communication protocol of the plurality of available communication protocols until the mobile device has either successfully established communication with the wireless printing device or has attempted to establish communication with the wireless printing device using each of the plurality of available communication protocols.

In some embodiments, prompting the user to indicate that one of the communication protocols was or was not successful in communicating with the wireless printing device may include sending a unique indicator associated with the communication protocol to the wireless printing device, prompting the user to identify the unique indicator on an output from the wireless printing device, and/or asking the user to select the unique indicator from a plurality of indicators that are displayed on a user interface of the wireless device. In some embodiments, the unique indicator includes at least one of a number, a letter, a symbol, an icon, and/or an image. In some embodiments, the unique indicator includes a three-digit number. In some embodiments, the plurality of indicators includes at least three indicators, of which only one is the unique indicator. In some embodiments, the plurality of indicators is displayed by the wireless device in a random order. In some embodiments, the wireless device is a wireless communication device, such as a cellular, satellite, Smartphone, such as an IPHONE® device, or other mobile phone, a personal digital assistant (PDA), or a wireless tablet, such as an IPAD® device.

In some embodiments, the wireless devices or the wireless communication devices do not have suitable drivers and/or related software installed for successfully communicating with the wireless printing device to print a print job, and in some embodiments the wireless devices and/or wireless communication devices are not configured to, and/or are not capable of, having such a driver and/or related software installed. Accordingly, methods according to the present disclosure may not include downloading, accessing, or utilizing conventional print drivers that otherwise may be used with laptop or desktop personal computers or other wireless devices (including wireless devices according to the present disclosure) that are configured to, and/or capable of, having suitable drivers and/or related software installed for successfully communicating with wireless printing devices. In some embodiments, configuring the wireless device to communicate with the wireless printing device may include the use of a user-friendly interface.

DETAILED DESCRIPTION AND BEST MODE OF THE DISCLOSURE

Figure 1:
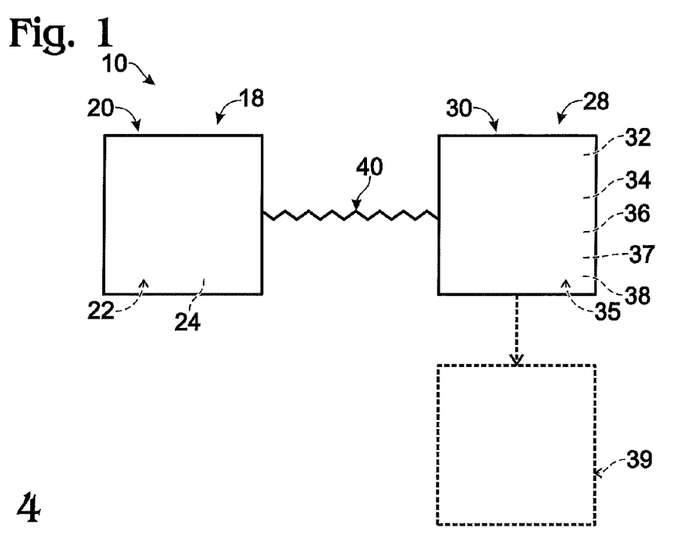
FIG. 1 is an illustrative, non-exclusive example of a wireless system that includes a wireless communication device and a wireless peripheral that may be utilized according to the present disclosure.

FIG. 1 is an illustrative, non-exclusive example of a wireless system 10 that may be utilized with the systems and methods according to the present disclosure. Wireless system 10 includes a wireless (and/or mobile) device 18, such as a communication device 20, in communication with a wireless peripheral 28, such as a wireless printing device 30 over a wireless communication link 40. As schematically illustrated in FIG. 1, wireless system 10, such as via the systems and methods disclosed herein, configures wireless device 18 to successfully communicate with wireless peripheral 28, such as to successfully generate a printed output 39 from wireless printing device 30.

Wireless device 18 may include any suitable mobile device that is configured to send and receive wireless communication signals, such as telephone calls, text messages, data/content from the Internet, etc. Wireless device 18 thus may include mobile computing devices, such as laptop computers, personal digital assistants (PDAs), mobile phones, and tablets (such as an IPAD® device). A subset of wireless devices 18 are wireless communication devices 20, which may include any suitable portable and/or mobile communication device, such as a cellular telephone 22 or Smartphone 24. Wireless communication devices 20 may be configured to send and receive information over wireless communication link 40 using any suitable wireless communication method, protocol, or standard. Illustrative, non-exclusive examples of wireless communication standards include (but are not limited to) a cellular telephone network, Wi-Fi, IEEE 802.11, Bluetooth, and/or infrared.

As used herein, "wireless communication devices," which also may be referred to as "mobile communication devices," may refer to portable communication devices, such as cellular, satellite and other mobile telephones, including Smartphones, whose primary function is to enable wireless communication between a user of the mobile communication device and one or more remotely located devices that may include another wireless communication device and/or a computer that is capable of providing access to information sources such as the Internet. When compared to a personal (or other) computer, wireless communication devices typically include fewer resources, such as less memory, less information storage space, and/or less computing power. This may be due to the fact that wireless communication devices are much smaller than a traditional computer and thus include significantly less system hardware and/or smaller components. Thus, wireless communication devices often offer significantly less functionality than a computer and may present unique issues when establishing communication between the wireless communication device and a wireless peripheral or device.

Wireless printing device 30 additionally or alternatively may be referred to herein as wireless print device 30, wireless print peripheral 30, wireless printing peripheral 30, and/or wireless peripheral 30. Wireless print device 30 may include any suitable device that is adapted to receive a wireless signal from wireless communication device 20 and produce a printed output therefrom. As an illustrative, non-exclusive example, wireless print device 30 may include a suitable stand-alone wireless printer 32 that includes a wireless interface 37. When wireless print device 30 includes wireless printer 32, the wireless communication device may communicate directly with the wireless printer over the wireless communication link. As another illustrative, non-exclusive example, wireless print device 30 may include a wired (i.e., physically connected) printer 34 and/or a wireless printer 32 that is in direct communication with a computing device 35, such as a personal computer 36 and/or an integrated or stand-alone print server 38, or other server, router, communication device, etc.

As discussed in more detail herein, in order for the wireless print device to receive and/or successfully utilize wireless signals sent by the wireless communication device, such as to properly print a print job or other content to be printed, these signals must be sent in a format that is understandable to the wireless print device. This may include selecting an appropriate network printing protocol (NPP) for communication with the wireless print device, an appropriate page description language (PDL) that is understandable by the wireless print device, and/or establishing an appropriate mode of communication with a print server that forms a portion of and/or is associated with the wireless print device.

A network printing protocol may define the formatting and/or rules for exchanging information between the wireless communication device and the wireless print device. Illustrative, non-exclusive examples of network printing protocols include (but are not limited to) internet printing protocol (IPP), server message block (SMB), line printer remote (LPR), line printer daemon (LPD), remote procedure call (RPC), internetwork packet exchange (IPX), transmission control protocol/internet protocol (TCP/IP), AppleTalk™, and/or simple network management protocol (SNMP).

A page description language is a high-level language that describes the layout and/or appearance of the page to be printed. Illustrative, non-exclusive examples of page description languages include (but are not limited to) advanced function presentation (AFP), Comtec™ printer control language (CPCL), Diablo™, datamax printer language (DPL), datamax ticket printer language (DTPL), device independent (DVI), Eltron™ programming language (EPL), Epson™ standard code for printers (ESC/P, ESC/P2), Hewlett-Packard™ geometric language (HP-GL, HP-GL2), graphics device interface (GDI), InterPress™, intelligent printer data stream (IPDS), Kyocera™ page description language (KPDL), line conditioned data stream (LCDS), mixed object document content architecture (MODCA), printer command language (PCL), portable document format (PDF), PostScript™, personal printer data stream (PPDS), refined printing command stream (RPCS), Samsung™ printer language (SPL), scalable vector graphics (SVG), XML paper specifications (XPS), Zenographics ZjStream™ Page Description Language (ZJS), and/or Zebra™ programming language (ZPL).

A print server is a computer or other device that is connected to one or more printers, receives print jobs from computers that are in communication with the print server, and sends the print jobs to the appropriate printer(s). Illustrative, non-exclusive examples of print servers include (but are not limited to) an OS X printer sharing server and a common UNIX printing system (CUPS) server.

As discussed in more detail herein, a wide variety of wireless communication standards, network printing protocols, and page description languages exist. Thus, there exists an even wider variety of combinations of wireless communication standard, network printing protocol, and page description language criteria that must be met in order for a specific wireless communication device to establish communication and successfully print a print job with a specific wireless printing device. This variety of combinations may be referred to herein as a plurality of communication protocols. The systems and methods disclosed herein may provide a user-friendly, efficient method of establishing communication with and successfully printing to a specific wireless printing device from a specific wireless communication device without requiring the user to possess knowledge regarding the specific one of the plurality of communication protocols that will be utilized once communication is established. In addition, the systems and methods provide a method of successfully establishing this communication without requiring prior knowledge regarding the wireless print device to be used and/or the need for device-specific drivers, which may be inconvenient to obtain or install and/or unavailable, uninstallable, or otherwise unsuitable for a specific wireless communication device.

Figure 2:
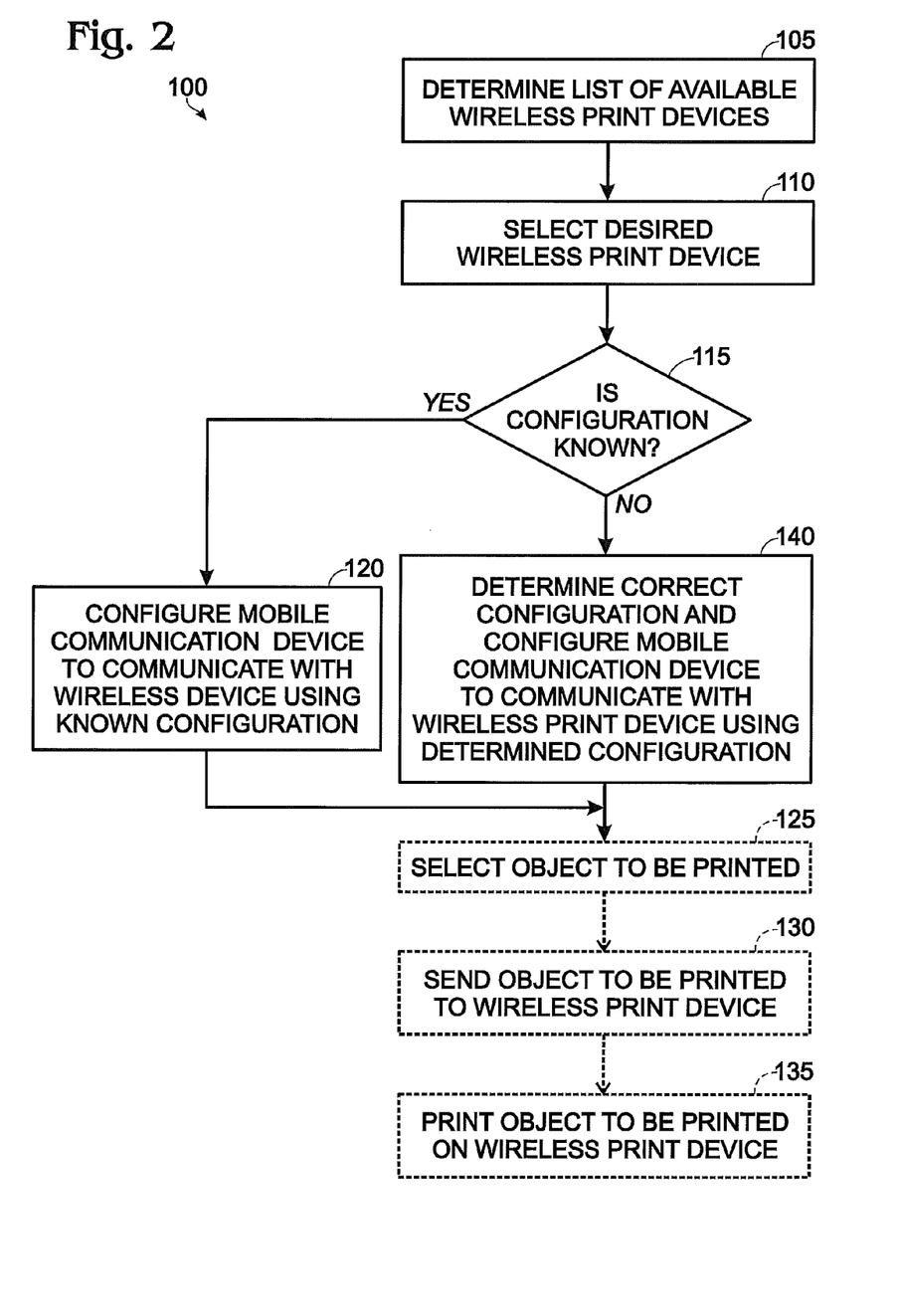
FIG. 2 is flow chart showing an illustrative, non-exclusive example of methods according to the present disclosure of determining a valid communication protocol that may be utilized to establish communication between a wireless communication device and a wireless peripheral according to the present disclosure.
Figure 3:
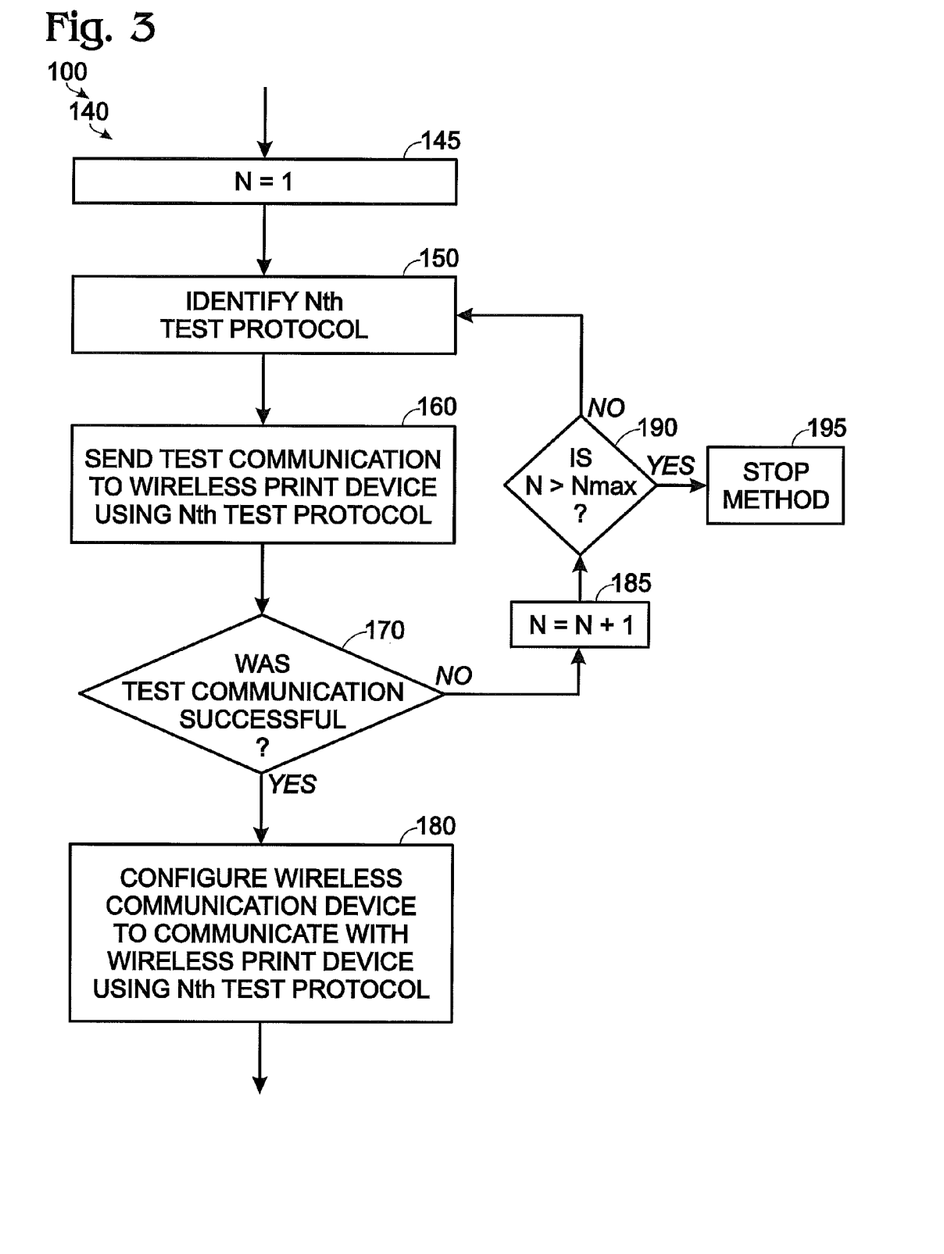
FIG. 3 is a flow chart showing an illustrative, non-exclusive example of a method according to the present disclosure of determining a valid protocol from a plurality of predetermined protocols for wireless communication between a wireless communication device and a desired wireless peripheral according to the present disclosure.
Figure 4:
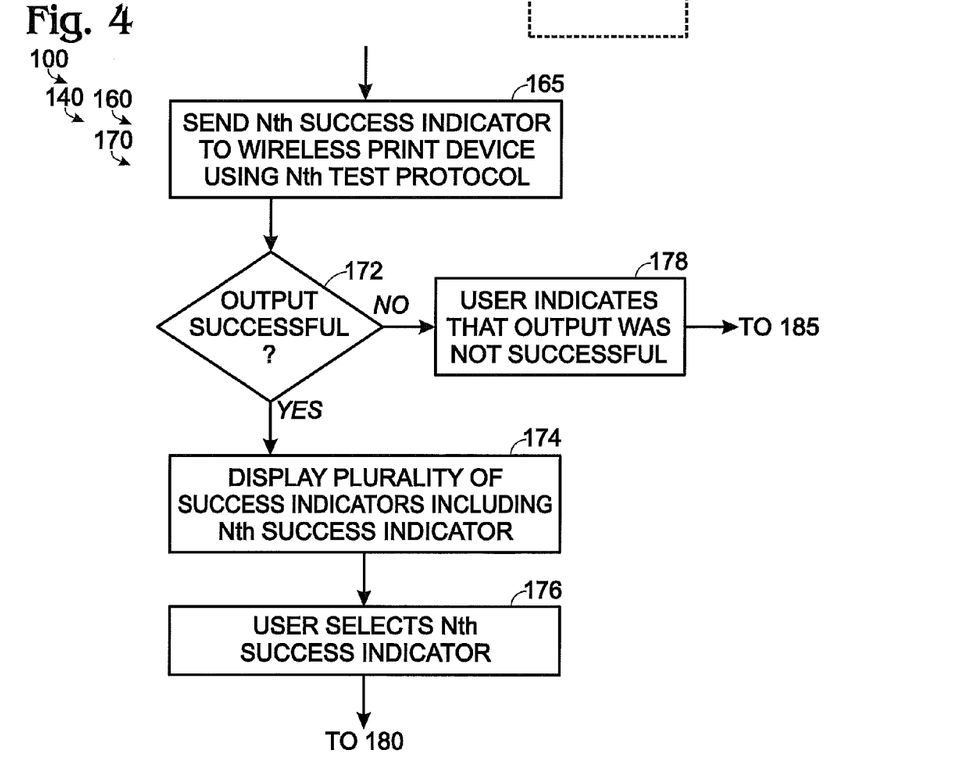
FIG. 4 is a flow chart showing an illustrative, non-exclusive example of a method according to the present disclosure of sending a test communication from a wireless communication device to a wireless peripheral and determining if the test communication was successfully received by the wireless peripheral.

Turning now to FIGS. 2-4, illustrative, non-exclusive examples of methods according to the present disclosure are schematically illustrated and indicated generally at 100. Methods 100 may be described as methods of determining a valid communication protocol that may be used to establish communication between a wireless device 18, such as a wireless communication device 20, and a wireless peripheral 28, such as a wireless print device 30. Additionally or alternatively, methods 100 according to the present disclosure may be described as methods of printing from a wireless device 18, such as a wireless communication device 20. The flow charts of FIGS. 2-4 schematically illustrate illustrative, non-exclusive examples of such methods, including portions of such methods, which may themselves be considered a method 100 according to the present disclosure, and methods 100 according to the present disclosure are not limited to including all of the illustrated steps. FIG. 2 illustrates some steps in dashed boxes, with such dashed boxes indicating that such steps may be optional or may correspond to an optional embodiment or version of a method according to the present disclosure. That said, not all methods according to the present disclosure are required to include the steps illustrated in solid boxes of the illustrated flow charts. The methods and steps illustrated in FIGS. 2-4 are not limiting to all embodiments of the present disclosure, and other methods and steps are also within the scope of the present disclosure, including methods having greater than or fewer than the number of steps illustrated, as well as alternative steps not expressly illustrated, as understood from the present disclosure. For example, software embodying methods according to the present disclosure is not required to use the precise logic of the illustrated examples of methods 100. That is, methods that utilize alternative logic, while performing the same function and/or similar functions and resulting in the same and/or similar outcomes, are also within the scope of the present disclosure. In other words, the flow charts of FIGS. 2-4 and the accompanying description herein provide illustrative, non-exclusive examples of implementing methods 100 according to the present disclosure, and the present disclosure is not limited to implementation according to the specific illustrated examples.

Methods according to the present disclosure may be embodied in the form of computer-readable instructions, or software, such as saved on computer-readable storage, or memory, media suitable for storing such computer-readable instructions. Illustrative, non-exclusive examples of such media include any suitable form of storage, or memory, device, including (but not limited to) CD-ROMs, disks, hard drives, flash memory, etc., such as may include software for transferring and/or downloading to a mobile device 18, as well as memory of a mobile device 18 itself. As used herein, storage, or memory, devices and media having computer-executable instructions, as well as methods according to the present disclosure, are considered to be within the scope of subject matter deemed patentable in accordance with the national laws of the country in which this patent application is pending, such as (but not limited to) Section 101 of Title 35 of the United States Code.

FIG. 2 is a flow chart showing an illustrative, non-exclusive example of methods 100 according to the present disclosure. For the purpose of simplifying this discussion, the following discussion will refer to establishing and utilizing communication between a wireless, or mobile, communication device 20 and a wireless print device 30. However, it remains within the scope of the present disclosure to include establishing communication between the more broadly defined wireless (and/or mobile) device 18 and/or a wireless peripheral 28.

FIG. 2 illustrates methods 100 that include determining a valid communication protocol that may be utilized to establish communication between wireless communication device 20 and wireless print device 30. As used herein, a valid communication protocol refers to a communication protocol from the plurality of communication protocols that may enable communication between the wireless communication device and the wireless print device and may include any suitable combination of standards and/or protocols, including the wireless communication standards, network printing protocols, and/or page description languages discussed in more detail herein.

Methods 100 may include, at 105, determining a list of available wireless print devices using any suitable method. This may include detecting wireless print devices that broadcast their location and/or availability using any suitable service discovery protocol. Illustrative, non-exclusive examples of service discovery protocols that may be utilized with the systems and methods according to the present disclosure may include (but are not limited to) Apple Bonjour™, Apple Rendevous™, zero configuration networking (zeroconf), and/or Bluetooth™ service discovery protocol. Determining the list of available wireless print devices at 105 also may include prompting the wireless communication device to search for the availability of a specific wireless print device. As an illustrative, non-exclusive example, this may involve the user inputting an internet protocol (IP) address, or other identifier, for a desired wireless print device into the wireless communication device and the wireless communication device attempting to locate the wireless print device that is associated with the given IP address, or other identifier. As used herein, available wireless printing devices include printing devices that are available to receive information from the wireless communication device and are within range of the wireless communication device using a wireless communication standard that is available to both the wireless communication device and the wireless print device.

Once the list of available wireless print devices has been established, methods 100 may include selecting, or prompting a user to select, a desired wireless print device from the list of available wireless print devices at 110. As an illustrative, non-exclusive example, this may include displaying the list of available wireless print devices on a user interface of the wireless communication device and prompting the user to select the desired wireless print device. The wireless print devices may be placed in any suitable order on the display of the wireless communication device. As illustrative, non-exclusive examples, the wireless print devices may be displayed in a random order. As another illustrative, non-exclusive example, the wireless print devices may be displayed in a systematic order, such as alphabetically, in order of their frequency of use by the wireless communication device, in order of their last use by the wireless communication device, in order of the strength of the communication signal between the individual wireless printing devices and the wireless communication device, and/or in order of their proximity to the wireless communication device.

Selecting the desired wireless print device also may include automatically selecting the wireless print device using any suitable criteria. As an illustrative, non-exclusive example, only a single wireless print device may be within range of the wireless communication device and this wireless print device may be selected automatically on account of it being the only identified (and/or available) wireless print device. As another illustrative, non-exclusive example, a last-used or most frequently used wireless print device may be selected automatically, with "used" referring to successful use by the particular wireless communication device to successfully generate a desired printed output. As yet another illustrative, non-exclusive example, the wireless print device with the strongest signal strength may be selected automatically. Additionally or alternatively, a wireless print device that was pre-selected by a user may be selected automatically, such as (but not required to be) corresponding to a user-preferred wireless print device. Other examples of selecting wireless print devices are also within the scope of the present disclosure.

Once the desired wireless print device has been selected, the methods 100 may then determine if a valid communication protocol for the desired wireless print device is already known by the wireless communication device at 115. As an illustrative, non-exclusive example, this may include determining that the wireless communication device has a valid communication protocol for the desired wireless print device stored in its memory. The stored valid communication protocol may be native to or resident in the software performing the methods disclosed herein, may have been determined through previous wireless communication with the desired wireless print device (such as via prior use of the systems and/or methods disclosed herein), may have been determined through previous communication with a similar wireless print device, and/or may have been obtained from another source. As another illustrative, non-exclusive example, determining if a valid communication protocol is already known may include consulting an online database of valid communication protocols to determine if a valid communication protocol has been previously established for the desired wireless print device in another manner, such as by another user configuring another wireless communication device to communicate with the desired wireless print device or a wireless print device that is similar to the desired wireless print device.

As an illustrative, non-exclusive example of suitable logic, if a valid communication protocol for the desired wireless print device is known to the wireless communication device, the methods follow the "Yes" leg from step 115 to step 120, wherein the mobile communication device is configured for communication with the desired wireless print device using the valid communication protocol. As used with respect to the methods disclosed herein, the "Yes" and "No" "legs" may additionally or alternatively be referred to as decisions, determinations, decision paths, responses, or outputs. If a valid communication protocol for the wireless print device is not known to the wireless communication device, the methods follow the "No" leg from step 115 to step 140, wherein the methods attempt to determine a valid communication protocol for the desired wireless print device and configure the wireless communication device to communicate with the desired wireless print device using the valid communication protocol.

Once a valid communication protocol for the desired wireless print device has been determined and the wireless communication device has been configured to communicate with the desired wireless print device, the methods optionally transition to step 125, wherein an object to be printed (i.e., a print job) may be selected. This may include selecting the object to be printed using any suitable criteria, or logic, and is discussed in more detail herein. The methods may then transition to step 130, wherein the object to be printed is sent to the desired wireless print device using the valid communication protocol. At step 135, the object to be printed may be output from the desired wireless print device as a printed output.

FIG. 3 provides a more detailed, but still illustrative, non-exclusive example, of methods 100 for determining a valid communication protocol for the desired wireless print device and configuring the wireless communication device to communicate with the desired wireless print device using the valid communication protocol as shown in step 140 of FIG. 2. Since the illustrative, non-exclusive example of FIG. 3 may include performing a series of repetitive steps until a valid communication protocol is determined from a plurality of available communication protocols or until the plurality of available communication protocols has been exhausted, FIG. 3 includes the use of an index, N. However, any suitable criteria for incrementing or transitioning from one of the plurality of available communication protocols to another of the plurality of available communication protocols may be utilized without departing from the scope of the present disclosure. Other suitable logic also may be used without departing from the scope of the present disclosure.

The method may include setting index, N, to a value of 1 at step 145 and transitioning to step 150, wherein an $N^{th}$ test protocol of the plurality of available communication protocols is selected and/or identified. The method may then transition to step 160, wherein a test communication is sent from the wireless communication device to the desired wireless print device using the $N^{th}$ test protocol. At step 170, the method may determine whether or not the test communication was successful in communicating with the desired wireless print device (i.e., does the $N^{th}$ test protocol represent a valid communication protocol for wireless communication between the wireless communication device and the wireless print device).

As an illustrative, non-exclusive example of suitable logic, if the test communication was successful in communicating with the desired wireless print device, the method follows the "Yes" leg from step 170 to step 180, wherein the wireless communication device is configured to communicate with the desired wireless print device using the determined valid communication protocol. Configuring the wireless communication device to communicate with the desired wireless print device using the determined valid communication protocol may include storing the valid communication protocol in a memory location of the wireless communication device and/or utilizing the valid communication protocol for future communication between the wireless communication device and the desired wireless print device.

Additionally or alternatively, if the test communication was not successful in communicating with the desired wireless print device, the method follows the "No" leg from step 170 to step 185, wherein the value of index N is increased. The method then continues to step 190, wherein the current value of N is optionally compared to a maximum value of N, which herein is referred to as $N_{max}$. If N is greater than $N_{max}$, the method may follow the "Yes" leg from step 190 to step 195 and the method may be stopped. Additionally or alternatively, if N is not greater than $N_{max}$, the method may follow the "No" leg from step 190 to step 150, and the method, or a portion thereof, may be repeated using the next test protocol of the plurality of communication protocols.

Identifying the $N^{th}$ test protocol of the plurality of communication protocols also may be referred to as selecting, determining, ascertaining, specifying, or choosing, and may include using any suitable criteria to determine a hierarchy and/or priority order for selecting a test protocol from the plurality of communication protocols, which as discussed herein may be a plurality of available communication protocols. As an illustrative, non-exclusive example, the plurality of available communication protocols may be arranged in a random priority order. As another illustrative, non-exclusive example, the plurality of available communication protocols may be arranged in a systematic order. This systematic order may be based on any suitable criteria, illustrative, non-exclusive examples of which include information provided to the wireless communication device by the wireless print device, information regarding the popularity and/or frequency of use of various printer makes and/or models, information regarding the frequency with which the method is used to configure a particular printer make and/or model, and/or regional, national, and/or world-wide printer sales data.

Sending a test communication to the wireless print device using the $N^{th}$ test protocol may include using the $N^{th}$ test protocol to create a print job and sending the print job to the desired wireless print device. As used herein, a print job is, and/or refers to, a file or set of files that is submitted to a printer to obtain a desired output from the printer. As discussed in more detail herein, this file or set of files must be formatted appropriately for the printer to which it or they are sent or the printer may be unable to interpret the print job and produce a printed output, or at least the desired output, therefrom. This formatting may include at least the use of an appropriate network printing protocol and/or the use of an appropriate page description language for the printer in question. Thus, sending a print job to the desired wireless printer using the $N^{th}$ test protocol includes, or may be preceded by, formatting the information to be printed according to the $N^{th}$ test protocol and then sending the formatted information to the desired wireless printer.

Determining whether or not the test communication was successful in communicating with the desired wireless print device at step 170 may include determining whether or not the print job produced an output from the desired wireless print device and/or whether or not the print job produced an expected, or desired, output from the desired wireless print device. It is within the scope of the present disclosure that a print job that is submitted to the desired wireless print device will produce the expected or desired output if the test protocol utilized is a valid communication protocol. Conversely, if the test protocol utilized is not a valid communication protocol, the desired wireless print device may not produce the expected, or desired, output. This may include the desired wireless print device producing no output and/or the desired wireless print device producing an output that is different from the expected, or desired, output.

Configuring the wireless communication device to communicate with the desired wireless print device using the $N^{th}$ test protocol at step 180 may be substantially similar to configuring the wireless communication device to communicate with the wireless print device using a known configuration. This is described in more detail herein with reference to step 120 of FIG. 2.

The maximum value of N, $N_{max}$, from step 190 may be determined in any suitable manner. As an illustrative, non-exclusive example, this may include setting $N_{max}$ equal to a total number of available communication protocols from the plurality of available communication protocols. Under these circumstances, the method may include attempting every available communication protocol before determining that the method will be unable to configure the wireless communication device for communication with the wireless print device and stopping the method after every available communication protocol is unsuccessful. However, it is also within the scope of the present disclosure that $N_{max}$ may be less than the total number of available communication protocols. As an illustrative, non-exclusive example, the method may select a subset of the plurality of available communication protocols, wherein the subset does not include all of the plurality of available communication protocols, and the method may stop the method if none of the subset represents a valid communication protocol.

Illustrative, non-exclusive examples of stopping the method at step 195 may include (but are not limited to) terminating the attempt to identify a valid communication protocol of step 140; terminating a software subroutine that performs step 140; terminating a software program that provides the user interface for method 100; and/or notifying the user that the configuration attempt was unsuccessful. Notifying the user that the configuration attempt was unsuccessful may include providing an output to the user that the communication attempt was unsuccessful, prompting the user for additional information, providing troubleshooting information to the user, and/or prompting the user to restart the method. This notifying may be provided via any suitable mechanism, with illustrative, non-exclusive examples including displaying a notice or suitable message on the wireless communication device's display and/or user interface, and generating or otherwise emitting an audible output that is audible to the user. Illustrative, non-exclusive examples of additional information may include the make, model, serial number, and/or other relevant information about the wireless communication device and/or the wireless print device. It is within the scope of the present disclosure that the method may further (but is not required to) include utilizing the additional information to more efficiently perform a second configuration attempt, utilizing the additional information to troubleshoot issues with the previous configuration attempt, and/or supplying the additional information to an online database so that it may be utilized to improve the method in the future. Illustrative, non-exclusive examples of providing troubleshooting information to the user may include asking the user one or more questions, prompting the user with one or more statements, and/or providing the user with one or more graphical images that may serve to improve the user's understanding of the configuration process and/or help the user to identify issues with and/or errors in the communication process.

FIG. 4 provides another more detailed, but still illustrative, non-exclusive, example of a flow chart describing the method of steps 160 and 170 of FIG. 3. Specifically, FIG. 4 provides an illustrative, non-exclusive example of a method of sending a test communication from the wireless communication device and determining if the test communication was successfully received by the wireless print device, such as responsive to receiving an output that indicates successful receipt of the test communication. It follows that successful receipt of the test communication includes and/or refers to the wireless print device receiving and properly processing and/or outputting a desired or selected output, and optionally a printed output, responsive to the test communication. The method of FIG. 4 includes sending a print job including an $N^{th}$ indicator to the wireless print device using the Nth test protocol at 165, and determining if the $N^{th}$ indicator was output successfully by the wireless print device at step 172. If the $N^{th}$ indicator was output successfully by the wireless print device, the method follows the "Yes" leg from step 172 to step 174, wherein the user interface of the wireless communication device displays a plurality of indicators including the $N^{th}$ indicator. The method then proceeds to step 176, wherein the method prompts the user to select the $N^{th}$ indicator from the plurality of displayed indicators before proceeding to step 180 of FIG. 3.

In contrast, if it is determined at step 172 that the $N^{th}$ indicator was not outputted successfully by the wireless print device, the method follows the "No" leg from step 172 to step 178. At step 178, the method includes permitting the user to indicate that the $N^{th}$ indicator was not outputted successfully by the wireless print device. Responsive to the user indicating that the $N^{th}$ indicator was not outputted successfully by the wireless print device, the method may proceed to step 185 of FIG. 3.

The indicator may be any suitable visual object that may be displayed on the user interface of the wireless communication device, may be outputted by the wireless print device, and is unique to the $N^{th}$ test protocol. Illustrative, non-exclusive examples of indicators according to the present disclosure include any suitable letter, number, character, icon, and/or image and may include a plurality of letters, numbers, characters, icons, and/or images. In addition, the indicators may be randomly or systematically generated. As an illustrative, non-exclusive example, the indicators may consist of three-digit numbers. Thus, sending a print job that includes the $N^{th}$ indicator using the $N^{th}$ test protocol at step 165 may include sending a print job that includes a unique visual object that will only display on the output from the wireless print device if the $N^{th}$ test protocol is a valid communication protocol.

Determining if the $N^{th}$ indicator was output successfully by the wireless print device at step 172 may include determining whether or not the $N^{th}$ test protocol produced a printed or other visual output from the wireless print device and determining whether or not the $N^{th}$ indicator is present on the visual output from the wireless print device. Displaying the plurality of indicators including the $N^{th}$ indicator at step 174 may include displaying a plurality of indicators on the user interface of the wireless communication device, wherein one of the plurality of indicators is the $N^{th}$ indicator. Displaying the plurality of indicators may further include displaying one or more dummy indicators. As used herein, a dummy indicator may refer to an indicator that is not associated with a test protocol and additionally or alternatively may be referred to as a simulated indicator, an imitation indicator, a substitute indicator, a mock indicator, a false indicator, a counterfeit indicator, and/or a fake indicator. This may include displaying one, two, three, four, five, or more than five, dummy indicators in addition to the $N^{th}$ indicator. The plurality of indicators may be arranged in any suitable pattern and/or order on the user interface of the wireless communication device. This may include displaying the plurality of indicators in a random order, as well as displaying the indicators in a systematic and/or predetermined order.

Displaying the Nth indicator and one or more dummy indicators, wherein each of the indicators does not, in itself, indicate that a particular test protocol is a valid communication protocol, may decrease the likelihood that a user may indicate that a particular test protocol is a valid communication protocol when in fact the test protocol did not produce any output from the desired wireless print device, or at least not the desired output from the desired wireless printing device. This is due to the fact that, rather than simply indicating the success or failure of the print job, the user instead matches an indicator obtained from the visual output of the desired wireless print device to the same indicator as displayed on the user interface of the wireless communication device, encouraging the user to physically view the visual output from the desired wireless print device and compare any indicator contained thereon to the display of the wireless communication device.

When the $N^{th}$ indicator is outputted successfully by the wireless print device, the user may inadvertently select a dummy indicator from the plurality of displayed indicators instead of selecting the $N^{th}$ indicator. Under these circumstances, it is within the scope of the present disclosure that the method may (but is not required to) include one or more of: notifying the user that an invalid indicator was selected; repeating the $N^{th}$ test protocol, wherein repeating the $N^{th}$ test protocol may include sending a print job that includes the $N^{th}$ indicator to the desired wireless print device or sending a new unique indicator that takes the place of the $N^{th}$ indicator to the desired wireless print device; restarting the method; proceeding as if the user had indicated that the method was not successful in outputting the $N^{th}$ indicator from the desired wireless print device; ceasing the method; and/or asking the user if the $N^{th}$ test protocol should be repeated.

FIGS. 5-10 provide illustrative, non-exclusive examples of a user interface 200 of an illustrative, non-exclusive example of a wireless communication device 20 during several of the optional steps of a method 100 according to the present disclosure. The wireless communication device illustrated in FIGS. 5-10 resembles an APPLE® IPHONE® device, but as discussed herein, other wireless devices and/or wireless communication devices are within the scope of the present disclosure, and methods, systems, and devices according to the present disclosure are not limited to being implemented with or on IPHONE® devices.

Figure 5:
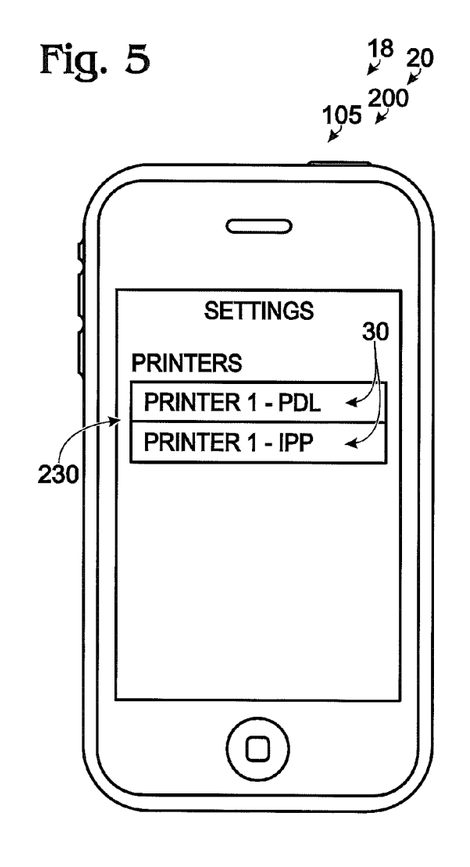
FIG. 5 is schematic representation of an illustrative, non-exclusive example of a user interface of a wireless device according to the present disclosure providing a list of available wireless peripherals according to the present disclosure.

In FIG. 5, a list 230 of available wireless print devices 30 is displayed on user interface 200. This may include displaying the list that was determined at step 105 of methods 100 according to the present disclosure. The list may include one or more unique wireless print devices and/or may include separate test protocol series that may be performed for a specific wireless print device. In the illustrative, non-exclusive example of FIG. 5, a single wireless print device has been detected and user interface 200 (which additionally or alternatively may be referred to as the display 200 of the wireless communication device) is displaying the option of performing a test communication using a PDL data stream or an IPP network printing protocol.

Figure 6:
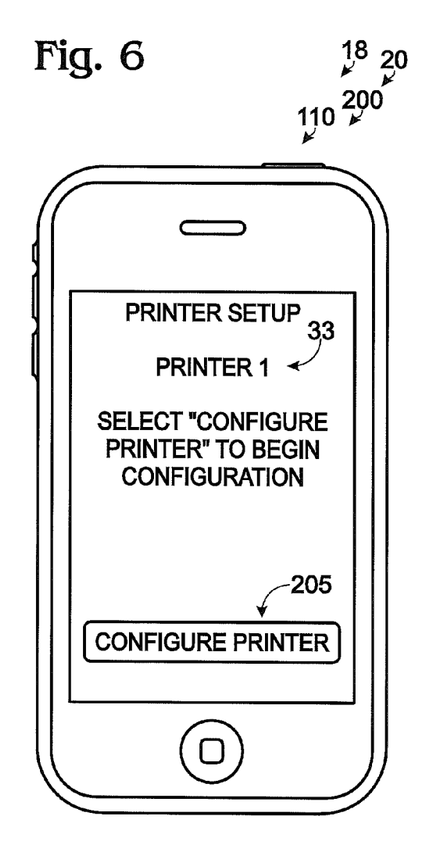
FIG. 6 is a schematic representation of an illustrative, non-exclusive example of a user interface of a wireless device according to the present disclosure that a user may use to configure a printer for printing according to the present disclosure.
Figure 7:
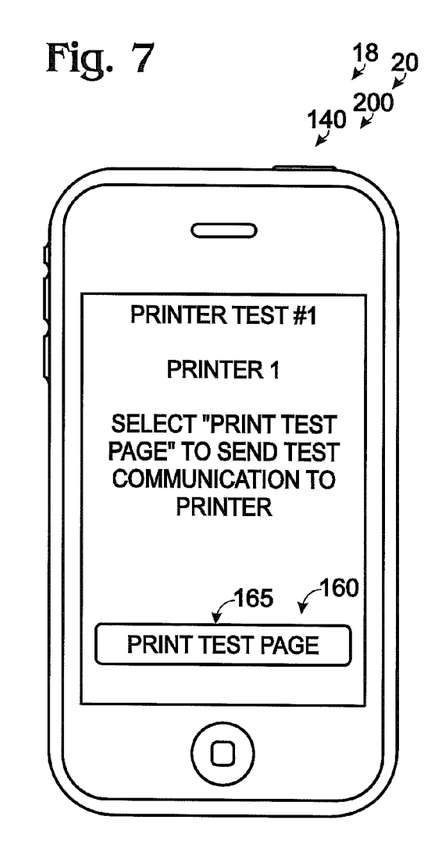
FIG. 7 is a schematic representation of an illustrative, non-exclusive example of a user interface of a wireless device according to the present disclosure displaying a step of a printer configuration process according to the present disclosure that involves communicating an indicator to the wireless printing device using an available protocol.

FIG. 6 is an illustrative, non-exclusive example of user interface 200 displaying a desired wireless printer 33 and awaiting user input, such as indicated at 205, prior to transmitting a test protocol to the desired wireless printer as described by step 110 of methods 100 according to the present disclosure. In FIG. 7, the user interface 200 is awaiting user input prior to sending a test communication including an indicator to the desired wireless print device, such as described by the illustrative, non-exclusive examples of steps 140, 160, and 165 of methods 100 according to the present disclosure.

Figure 8:
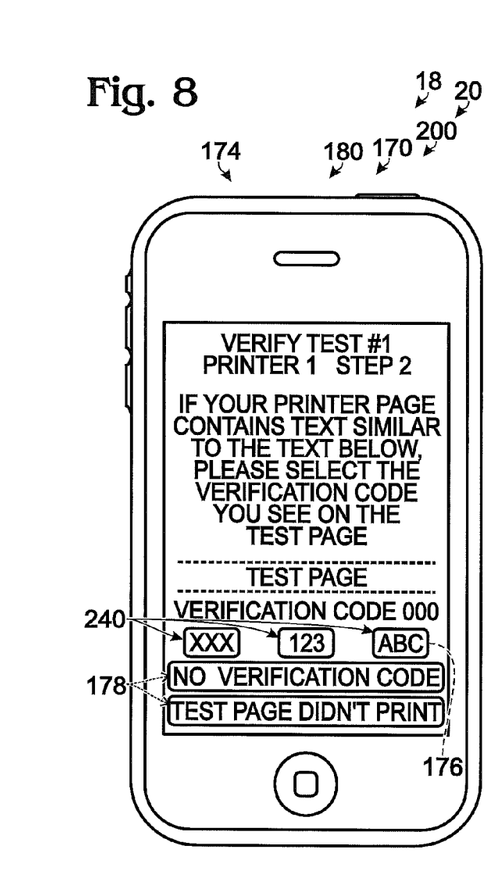
FIG. 8 is a schematic representation of an illustrative, non-exclusive example of a user interface of a wireless device according to the present disclosure displaying a step of a printer configuration process according to the present disclosure that involves prompting the user to verify that the wireless communication device was successful in communicating an indicator to the wireless printing device using the available protocol and/or prompting the user to indicate that the communication using the available protocol was not successful.

In FIG. 8, the test communication including the indicator has been sent to the wireless print device, and the user interface of wireless communication device 20 is displaying a plurality of indicators 240, as described by method step 174, and prompting the user to indicate the successfulness of the test communication, as described by method steps 170 and 180. This may include the user inputting that the test communication was not successful, as described by method step 178, or selecting an indicator that corresponds to the indicator displayed on the printed output from the desired wireless print device, as described by method step 176. As discussed in more detail herein, the method may be repeated, producing similar user interface screens, until a valid configuration is determined for communication between the wireless communication device and the wireless print device. Once a valid configuration has been determined and the wireless communication device has been configured to print to the wireless print device using the valid configuration as described by method step 120 or 180, the user may optionally select an object (and/or print job) to be printed by the wireless print device.

Figure 9:
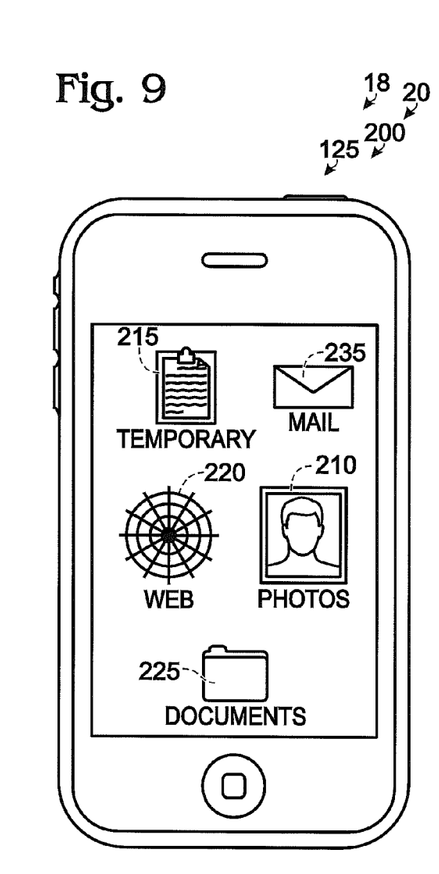
FIG. 9 is a schematic representation of an illustrative, non-exclusive example of a user interface of a wireless device according to the present disclosure displaying content sources that may be utilized to provide content for printing according to the present disclosure.

Objects to be printed by the wireless print device may be obtained from any suitable location or source, such as that stored at least temporarily in the memory of wireless communication device 20 and/or which is accessible by wireless communication device 20. FIG. 9 provides a schematic representation of an illustrative, non-exclusive example of sources of objects to be printed that may be utilized with the systems and methods according to the present disclosure. This may include (but is not limited to) objects that are stored in a temporary image storage location 215, such as the IPHONE® Pasteboard or WINDOWS® clipboard, image files 210 stored in a permanent image storage location on the wireless communication device, the World Wide Web or another network document storage location 220, documents 225 stored on the wireless communication device, and/or email documents 235 received by the wireless communication device.

Printing objects that are stored in temporary image storage location 215 may include selecting an object to be printed using the user interface of the wireless communication device, creating an image representative of the object to be printed in the temporary image storage location on the wireless communication device, selecting the image or image file from the temporary image storage location, and printing the image or image file. Printing photographs 210 or other documents 225 that are stored on the wireless communication device may include selecting the document to be printed, optionally editing (i.e., resizing, cropping, altering, etc.) the photograph or other document as desired prior to printing, and printing the document on the wireless print device. Printing objects that are stored on a networked storage location 220, such as the World Wide Web, may include opening the object on the wireless communication device and printing the object from the wireless communication device. Additionally or alternatively, printing objects that are stored on a network location may include providing the network location of the object and printing the object directly from the network location.

Figure 10:
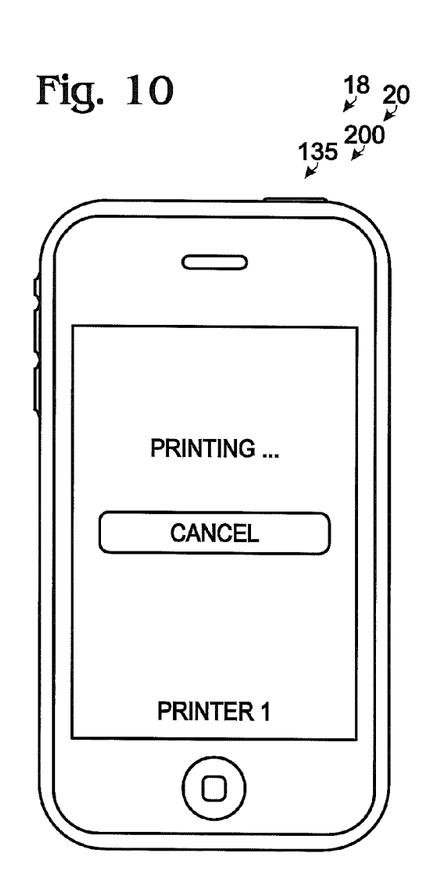
FIG. 10 is a schematic representation of an illustrative, non-exclusive example of a user interface of a wireless device according to the present disclosure while the wireless communication device is printing to the wireless printing device.

Once an object to be printed has been selected, it may be transmitted from the wireless communication device to the wireless print peripheral using the valid protocol for communication between the wireless communication device and the desired wireless print peripheral. An illustrative, non-exclusive example of a user interface of the wireless communication device during the printing process is shown in FIG. 10.

It is within the scope of the present disclosure that the systems and methods disclosed herein may be incorporated into any suitable wireless communication device in any suitable manner. As illustrative, non-exclusive examples, this may include distributing software that performs the method with the wireless communication device, installing software that performs the method on the wireless communication device, and downloading software that performs the method directly to the wireless communication device and/or to a personal or laptop computer that is in communication with the wireless communication device. It is within the scope of the present disclosure that software that performs the method may include a separate, stand-alone software package that is installed on the wireless communication device, updating a different software package that is installed on the wireless communication device to perform the method, and/or incorporating a module, subroutine, plug-in, and/or code that performs the method into a different software package that may be installed on the wireless communication device. It is further within the scope of the present disclosure that the method may include supplying the object to be printed to a print service, such as an online print service.

The systems and methods disclosed herein have been described with reference to a wireless device, such as a wireless communication device, wireless telephone, cellular telephone, mobile telephone, satellite telephone, PDA, Smartphone, wireless tablet, wireless computer, laptop computer, notebook computer, netbook computer, and/or the like. However, it is within the scope of the present disclosure that the systems and methods disclosed herein may be utilized with any suitable wireless device where it is desirable to be able to print to a wireless printer from the device. Conventional wireless devices typically include a variety of hardware and software components that are not discussed in detail herein but which are included within the scope of the present disclosure. Illustrative, non-exclusive examples of such components include, but are not limited to, one or more of a wireless transmitter; a wireless receiver; volatile memory; non-volatile memory; data storage capabilities; a display that may form a portion of the user interface; an input device that may form a portion of the user interface, such as a keypad or touchscreen; one or more interface ports; a processor; an energy storage device, such as a battery; an energy storage device charging port; operating system software; and/or additional software applications, subroutines, and the like that provide additional functionality to the device. It is not required for a wireless device according to the present disclosure to include any of these components, and it is also within the scope of the present disclosure that a wireless device may include one or more additional components in addition to or in place of the previously presented illustrative, non-exclusive examples.

Similarly, the systems and methods disclosed herein have also been described with reference to a wireless peripheral or device, such as a wireless print peripheral, wireless printing peripheral, wireless print device, wireless printing device, and/or wireless printer. In addition to the structure and software discussed above with reference to wireless devices, wireless print peripherals also may include hardware and software components, illustrative, non-exclusive examples of which include, but are not limited to, a paper or other printable media storage location; an apparatus for transferring an object to be printed to the printable media; a power source; and/or a facility for collecting and/or storing printed media. It is not required for a wireless peripheral according to the present disclosure to include any of these components, and it is also within the scope of the present disclosure that a wireless peripheral may include one or more additional components in addition to, or in place of, the previously presented illustrative, non-exclusive examples.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagrams, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" or "including" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that the provisional patent application that is incorporated by reference herein defines a term in a manner or is otherwise inconsistent with the non-incorporated portion of the present disclosure, the non-incorporated portion of the present disclosure shall control, and the term or incorporated disclosure therein shall only control with respect to the provisional patent application in which the term is defined.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of configuring a wireless device, which optionally may be or include a wireless communication device, for communicating with a wireless print peripheral, which optionally may be or include a wireless print device, and which optionally may be referred to as a method of printing from a wireless device, the method comprising:

determining available wireless print peripherals, wherein the available wireless print peripherals include one or more wireless print peripherals;

selecting a desired wireless print peripheral from the available wireless print peripherals;

identifying a first test protocol from a plurality of predetermined protocols for wireless communication between the wireless device and the desired wireless print peripheral;

sending a first test communication from the wireless device to the desired wireless print peripheral using the first test protocol to produce an output from the desired wireless print peripheral indicative of a successful communication between the wireless device and the desired wireless print peripheral;

prompting, by the wireless device, a user to indicate the successfulness of the first test communication to produce the output; and configuring the wireless device to communicate with the desired wireless print peripheral using the first test protocol responsive to the user indicating that the first test communication was successful.

A2. The method of paragraph A1, wherein the first test communication includes a first success indicator associated with the first test communication.

A3. The method of paragraph A2, wherein the method further includes, prior to the prompting, displaying, by the wireless device, a first plurality of indicators on a user interface of the wireless device, wherein the first plurality of indicators includes the first success indicator and at least one mock indicator.

A4. The method of paragraph A3, wherein the first success indicator is associated with the output from the desired wireless print peripheral, and further wherein prompting the user to verify the successfulness of the first test communication includes prompting the user to verify that the first success indicator was output by the desired wireless print peripheral by selecting the first success indicator from the first plurality of indicators.

A5. The method of any of paragraphs A1-A4, wherein, concurrent with prompting the user to select the first success indicator from the plurality of indicators, the method further includes prompting the user to indicate that the first test communication was not successful responsive to the first test communication not being output by the desired wireless print peripheral.

A6. The method of paragraph A5, further comprising identifying a second test protocol from the plurality of predetermined protocols for wireless communication between the wireless device and the desired wireless print peripheral; sending a second test communication from the wireless device to the desired wireless print peripheral using the second test protocol to produce the output from the desired wireless print peripheral indicative of a successful communication between the wireless device and the desired wireless print peripheral; prompting the user to verify the successfulness of the second test communication to produce the output; and configuring the wireless device to communicate with the desired wireless print peripheral using the second test protocol responsive to the user indicating that the second test communication was successful.

A7. The method of paragraph A6, wherein the second test communication includes a second success indicator associated with the second test communication.

A8. The method of paragraph A7, wherein the method further includes displaying a second plurality of indicators on the user interface of the wireless device, wherein the second plurality of indicators includes the second success indicator and at least one mock indicator.

A9. The method of paragraph A8, wherein the second success indicator is associated with the output from the desired wireless print peripheral, and further wherein prompting the user to verify the successfulness of the second test communication includes prompting the user to verify that the second success indicator was output by the desired wireless print peripheral by selecting the second success indicator from the second plurality of indicators.

A10. The method of any of paragraphs A1-A9, wherein the desired wireless print peripheral includes a wireless printer.

A11. The method of paragraph A10, wherein at least one of the first success indicator and the second success indicator being output by the desired wireless print peripheral includes at least one of the first success indicator and the second success indicator being printed by the wireless printer.

A12. The method of any of paragraphs A10-A11, wherein the first test communication includes a first print job.

A13. The method of any of paragraphs A10-A12, wherein the second test communication includes a second print job.

A14. The method of any of paragraphs A1-A13, wherein the determining includes determining the available wireless print peripherals using a service discovery protocol.

A15. The method of any of paragraphs A1-A14, wherein the determining includes prompting the user to input an IP address of the desired wireless print peripheral.

A16. The method of any of paragraphs A1-A15, wherein the method further includes displaying the available wireless print peripherals on a user interface of the wireless device.

A17. The method of paragraph A16, wherein the selecting includes selecting the desired wireless print peripheral from the available wireless print peripherals displayed on the user interface of the wireless device.

A18. The method of any of paragraphs A1-A17, wherein the plurality of predetermined protocols for wireless communication between the wireless device and the desired wireless print peripheral includes a wireless communication standard.

A19. The method of any of paragraphs A1-A18, wherein the plurality of predetermined protocols for wireless communication between the wireless device and the desired wireless print peripheral includes a page description language.

A20. The method of any of paragraphs A1-A19, wherein the plurality of predetermined protocols for wireless communication between the wireless device and the desired wireless print peripheral includes a network printing protocol.

A21. The method of any of paragraphs A1-A20, wherein the plurality of predetermined protocols for wireless communication between the wireless device and the desired wireless print peripheral includes protocols for communication with a print server.

A22. The method of any of paragraphs A1-A21, wherein, prior to the identifying, the method further includes displaying a list of protocols representative of the plurality of predetermined protocols on the user interface of the wireless device, and further wherein identifying at least one of the first test protocol and the second test protocol includes receiving a user selection of at least one of the first test protocol and the second test protocol from the list of protocols, and optionally wherein displaying a list of protocols representative of the plurality of predetermined protocols includes displaying a subset of the plurality of predetermined protocols, and further optionally wherein selecting at least one of the first test protocol and the second test protocol from the list of protocols includes selecting from the subset of the plurality of predetermined protocols.

A23. The method of any of paragraphs A1-A22, wherein the method further includes automatically selecting at least one of the first test protocol and the second test protocol from the plurality of predetermined protocols.

A24. The method of any of paragraphs A2-A23, wherein the first success indicator includes at least one of a letter, a number, a symbol, an icon, and an image, and optionally wherein, when dependent on any of paragraphs A7-A23, wherein at least one of the first success indicator and the second success indicator includes at least one of a letter, a number, a symbol, an icon, and an image.

A25. The method of paragraph A24, wherein at least one of the first success indicator and the second success indicator is at least one of randomly selected and systematically selected.

A26. The method of any of paragraphs A24-A25, wherein at least one of the first success indicator and the second success indicator includes a three-digit number.

A27. The method of any of paragraphs A3-A26, wherein the at least one mock indicator is not associated with any of the plurality of predetermined protocols for wireless communication between the wireless device and the desired wireless print peripheral.

A28. The method of paragraph A27, wherein the at least one mock indicator is different from the first success indicator and the second success indicator.

A29. The method of any of paragraphs A27-A28, wherein the at least one mock indicator includes at least two mock indicators, optionally including three mock indicators, four mock indicators, five mock indicators, or more than five mock indicators.

A30. The method of any of paragraphs A27-A29, wherein at least one of displaying the first plurality of indicators and displaying the second plurality of indicators includes displaying the indicators in at least one of a random order and a systematic order.

A31. The method of any of paragraphs A27-A30, wherein the first success indicator and the second success indicator are not readily identifiable by the user as being associated with a valid communication protocol based solely on the visual form of the first success indicator and the second success indicator, and optionally wherein the first success indicator and the second success indicator are similar in form to the at least one mock indicator, and further optionally wherein the first success indicator and the second success indicator are not readily distinguishable by the user from the at least one mock indicator.

A32. The method of any of paragraphs A1-A31, wherein prompting the user to indicate the successfulness of at least one of the first test protocol and the second test protocol to produce the output includes prompting the user to indicate that at least one of the first test protocol and the second test protocol is a valid protocol for communication between the wireless device and the desired wireless print peripheral, wherein the valid protocol includes a test protocol that produces a desired output from the desired wireless print peripheral when a communication is sent from the wireless device to the desired wireless print peripheral using the valid protocol.

A33. The method of paragraph A32, the method further including storing the valid protocol for wireless communication between the wireless device and the desired wireless print peripheral on the wireless device.

A34. The method of paragraph A33, the method further including utilizing the valid protocol for a future communication between the wireless device and the desired wireless print peripheral.

A35. The method of paragraph A34, the method further including automatically configuring the wireless device to utilize the valid protocol responsive to a future selection of the desired wireless print device by the user.

A36. The method of any of paragraphs A32-A35, the method further including transmitting the valid protocol to a remote information storage location.

A37. The method of paragraph A36, wherein the remote information storage location includes at least one of a remote computer, a remote server, a remote database, an online server, and a remote information storage device.

A38. The method of any of paragraphs A36-A37, the method further including permitting the transmitting of the valid protocol to a database of valid protocols.

A39. The method of paragraph A38, wherein prior to identifying the first test protocol, the method further includes communicating with the remote information storage location; searching for a valid protocol for the desired wireless print peripheral on the remote information storage location; and configuring the wireless device to communicate with the desired wireless print peripheral using the valid protocol for the desired wireless print peripheral and ceasing the method responsive to finding a valid protocol for the desired wireless print peripheral on the remote information storage location.

A40. The method of any of paragraphs A1-A39, wherein the method further includes selecting an object to be displayed by the desired wireless print peripheral.

A41. The method of paragraph A40, wherein the method further includes displaying the object to be displayed on the desired wireless print peripheral, optionally including printing the object to be displayed on the desired wireless print peripheral.

A42. The method of any of paragraphs A40-A41, wherein the method further includes copying an image of the object to be displayed to an image storage location on the wireless device; communicating the image of the object to be printed from the image storage location to the desired wireless print peripheral; and displaying the object to be displayed on the desired wireless print peripheral.

A43. The method of any of paragraphs A40-A42, wherein the method further includes providing the object to be displayed to an online print service.

A44. The method of any of paragraphs A1-A43, wherein the output includes a visual output.

A45. The method of any of paragraphs A1-A44, wherein the output includes a printed output.

A46. The method of any of paragraphs A1-A45, wherein the wireless device and/or wireless communication device, does not include a print driver for the desired wireless print peripheral.

A47. The method of any of paragraphs A1-A46, wherein the method does not include installing a print driver for the desired wireless print peripheral on the wireless device and/or the wireless device.

A48. The method of any of paragraphs A1-A47, wherein the determining includes at least one of determining by the wireless device, determining by the user, the user commanding the wireless device to determine, and the wireless device prompting the user to determine.

A49. The method of any of paragraphs A1-A48, wherein the selecting includes at least one of selecting by the wireless device, selecting by the user, the user commanding the wireless device to select, and the wireless device prompting the user to select.

A50. The method of any of paragraphs A1-A49, wherein the identifying includes at least one of identifying by the wireless device, identifying by the user, the user commanding the wireless device to identify, and the wireless device prompting the user to identify.

A51. The method of any of paragraphs A1-A50, wherein the sending includes at least one of sending by the wireless device, sending by the user, the user commanding the wireless device to send, and the wireless device prompting the user to send.

A52. The method of any of paragraphs A1-A51, wherein the configuring includes at least one of configuring by the wireless device, configuring by the user, the user commanding the wireless device to configure, and the wireless device prompting the user to configure.

B1. A method of configuring a wireless device, which optionally may be or include a wireless communication device, for printing to a wireless printer, the method comprising:
 determining available wireless printers, wherein the available wireless printers include at least a first wireless printer;
 selecting a desired wireless printer from the available wireless printers;
 identifying a plurality of predetermined protocols for wireless communication between the wireless device and the desired wireless printer; and
 step for determining a valid protocol from the plurality of predetermined protocols for wireless communication between the wireless device and the desired wireless printer.

B2. The method of paragraph B1 utilized with any appropriate combination of the methods of paragraphs A1-A52.

B3. The method of any of paragraphs B1-B2, wherein the step for determining includes any appropriate method as described in paragraphs A1-A52.

B4. The method of any of paragraphs B1-B3, wherein the determining includes at least one of determining by the wireless device, determining by the user, the user commanding the wireless device to determine, and the wireless device prompting the user to determine.

B5. The method of any of paragraphs B1-B4, wherein the selecting includes at least one of selecting by the wireless device, selecting by the user, the user commanding the wireless device to select, and the wireless device prompting the user to select.

B6. The method of any of paragraphs B1-B5, wherein the identifying includes at least one of identifying by the wireless device, identifying by the user, the user commanding the wireless device to identify, and the wireless device prompting the user to identify.

B7. The method of any of paragraphs B1-B6, wherein the step for determining includes a step for determining that is performed at least in part by the wireless device, optionally including a step for determining that is performed entirely by the wireless device.

C1. A wireless device configured to perform any of the methods of paragraphs A1-B7.

C2. Computer readable storage media including computer-executable instructions that, when executed, direct a wireless device to perform any of the methods of paragraphs A1-B7.

C3. A wireless device, which optionally may be or include a wireless communication device, comprising:
 a memory device including computer-executable instructions that, when executed, direct the wireless device to perform any of the methods of paragraphs A1-B7;
 a wireless communication link;
 a user interface; and
 a user input mechanism configured to receive user inputs.

INDUSTRIAL APPLICABILITY

The systems and methods for identifying and configuring printers for wireless printing by mobile communication devices are applicable to the wireless communications industry.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

The invention claimed is:

1. A method of configuring a wireless device for communicating with a wireless printing peripheral, the method comprising:
 determining, by the wireless device, available wireless printing peripherals, wherein the available wireless printing peripherals include one or more wireless printing peripherals;
 selecting a desired wireless printing peripheral from the available wireless printing peripherals;
 identifying a first test protocol from a plurality of predetermined protocols for wireless communication between the wireless device and the desired wireless printing peripheral;
 sending, by the wireless device, a first test communication from the wireless device to the desired wireless printing peripheral using the first test protocol, wherein the first test communication includes a first success indicator associated with the first test communication, and further wherein the desired wireless printing peripheral producing an output that includes the first success indicator is indicative of a successful communication between the wireless device and the desired wireless printing peripheral;
 displaying, by the wireless device, a first plurality of indicators on a user interface of the wireless device, wherein the first plurality of indicators includes the first success indicator and at least one mock indicator;
 prompting, by the wireless device, a user to indicate the successfulness of the first test communication to produce the output; and
 configuring the wireless device to communicate with the desired wireless printing peripheral using a valid protocol that includes the first test protocol responsive to the user indicating that the first test communication was successful, wherein the valid protocol produces a desired visual output from the desired wireless printing peripheral when a communication is sent from the wireless device to the desired wireless printing peripheral using the valid protocol.

2. The method of claim 1, wherein the wireless device is a wireless communication device.

3. The method of claim 2, wherein the wireless communication device does not include a print driver for the desired wireless printing peripheral.

4. The method of claim 3, wherein the method does not include installing a print driver for the desired wireless printing peripheral on the wireless device.

5. The method of claim 1, wherein the output is a visual output.

6. The method of claim 1, wherein prompting the user to verify the successfulness of the first test communication includes prompting the user to verify that the first success indicator is present in the output from the desired wireless printing peripheral by selecting the first success indicator from the first plurality of indicators.

7. The method of claim 1, wherein producing an output that includes the first success indicator includes printing the first success indicator with the desired wireless printing peripheral.

8. The method of claim 1, wherein the first success indicator includes at least one of a letter, a number, a symbol, an icon, and an image, and further wherein the first success indicator is randomly selected.

9. The method of claim 1, wherein, concurrent with prompting the user to indicate the successfulness of the first test communication to produce the output, the method further includes prompting the user to indicate that the first test communication was not successful responsive to the output not being produced by the desired wireless printing peripheral.

10. The method of claim 9, the method further comprising:
identifying a second test protocol from the plurality of predetermined protocols for wireless communication between the wireless device and the desired wireless printing peripheral;
sending, by the wireless device, a second test communication from the wireless device to the desired wireless printing peripheral using the second test protocol, wherein the second test communication includes a second success indicator associated with the second test communication, and further wherein the desired wireless printing peripheral producing an output that includes the second success indicator is indicative of a successful communication between the wireless device and the desired wireless printing peripheral;
displaying, by the wireless device, a second plurality of indicators on the user interface of the wireless device, wherein the second plurality of indicators includes the second success indicator and at least one mock indicator;
prompting, by the wireless device, the user to verify the successfulness of the second test communication to produce the output; and
configuring the wireless device to communicate with the desired wireless printing peripheral using the valid protocol that includes the second test protocol responsive to the user indicating that the second test communication was successful.

11. The method of claim 10, wherein prompting the user to verify the successfulness of the second test communication includes prompting the user to verify that the second success indicator is present in the output from the desired wireless printing peripheral by selecting the second success indicator from the second plurality of indicators.

12. The method of claim 10, wherein producing an output that includes the second success indicator includes printing the second success indicator with the desired wireless printing peripheral.

13. The method of claim 10, wherein the second success indicator includes at least one of a letter, a number, a symbol, an icon, and an image, and further wherein the second success indicator is randomly selected.

14. The method of claim 1, wherein the desired wireless printing peripheral includes a wireless printer.

15. The method of claim 1, wherein the determining includes determining the available wireless printing peripherals using a service discovery protocol.

16. The method of claim 1, wherein the determining includes prompting the user to input an IP address of the desired wireless printing peripheral.

17. The method of claim 1, wherein the method further includes displaying, by the wireless device, a list of available wireless printing peripherals on a user interface of the wireless device, and further wherein the selecting includes selecting the desired wireless printing peripheral from the list of available wireless printing peripherals displayed on the user interface of the wireless device.

18. The method of claim 1, wherein the plurality of predetermined protocols for wireless communication between the wireless device and the desired wireless printing peripheral includes a wireless communication standard.

19. The method of claim 1, wherein the plurality of predetermined protocols for wireless communication between the wireless device and the desired wireless printing peripheral includes a page description language.

20. The method of claim 1, wherein the plurality of predetermined protocols for wireless communication between the wireless device and the desired wireless printing peripheral includes a network printing protocol.

21. The method of claim 1, wherein the plurality of predetermined protocols for wireless communication between the wireless device and the desired wireless printing peripheral includes protocols for communication with a print server.

22. The method of claim 1, wherein the at least one mock indicator is not associated with any of the plurality of predetermined protocols for wireless communication between the wireless device and the desired wireless printing peripheral, and further wherein the at least one mock indicator is different from the first success indicator.

23. The method of claim 1, further including storing, by the wireless device, the valid protocol on the wireless device; utilizing, by the wireless device, the valid protocol for a future communication between the wireless device and the desired wireless printing peripheral; and automatically configuring, by the wireless device, the wireless device to utilize the valid protocol responsive to a future selection of the desired wireless printing peripheral by the user.

24. The method of claim 1, wherein the method further includes transmitting, by the wireless device, the valid protocol to a remote information storage location as a stored valid protocol.

25. The method of claim 24, wherein, prior to identifying the first test protocol, the method further includes:
communicating, by the wireless device, with the remote information storage location;

searching, by the wireless device, for the stored valid protocol for the desired wireless printing peripheral on the remote information storage location; and configuring, by the wireless device, the wireless device to communicate with the desired wireless printing peripheral using the stored valid protocol for the desired wireless printing peripheral and ceasing the method responsive to the stored valid protocol for the desired wireless printing peripheral being available on the remote information storage location.

26. The method of claim 1, wherein the method further includes receiving, by the wireless device, user input regarding an object to be printed; copying, by the wireless device, an image of the object to be printed to a temporary image storage location on the wireless device; communicating, by the wireless device, the image of the object to be printed from the image storage location to the desired wireless printing peripheral; and printing, by the desired wireless printing peripheral, the object to be printed.

27. The method of claim 1, wherein the selecting includes the wireless device prompting the user to select.

28. The method of claim 1, wherein the identifying includes the wireless device prompting the user to identify.

29. A wireless device, comprising:
a memory device including computer-executable instructions that, when executed, direct the wireless device to perform the method of claim 1;
a wireless communication link;
a user interface; and
a user input mechanism configured to receive user inputs.

* * * * *